Figure 1:
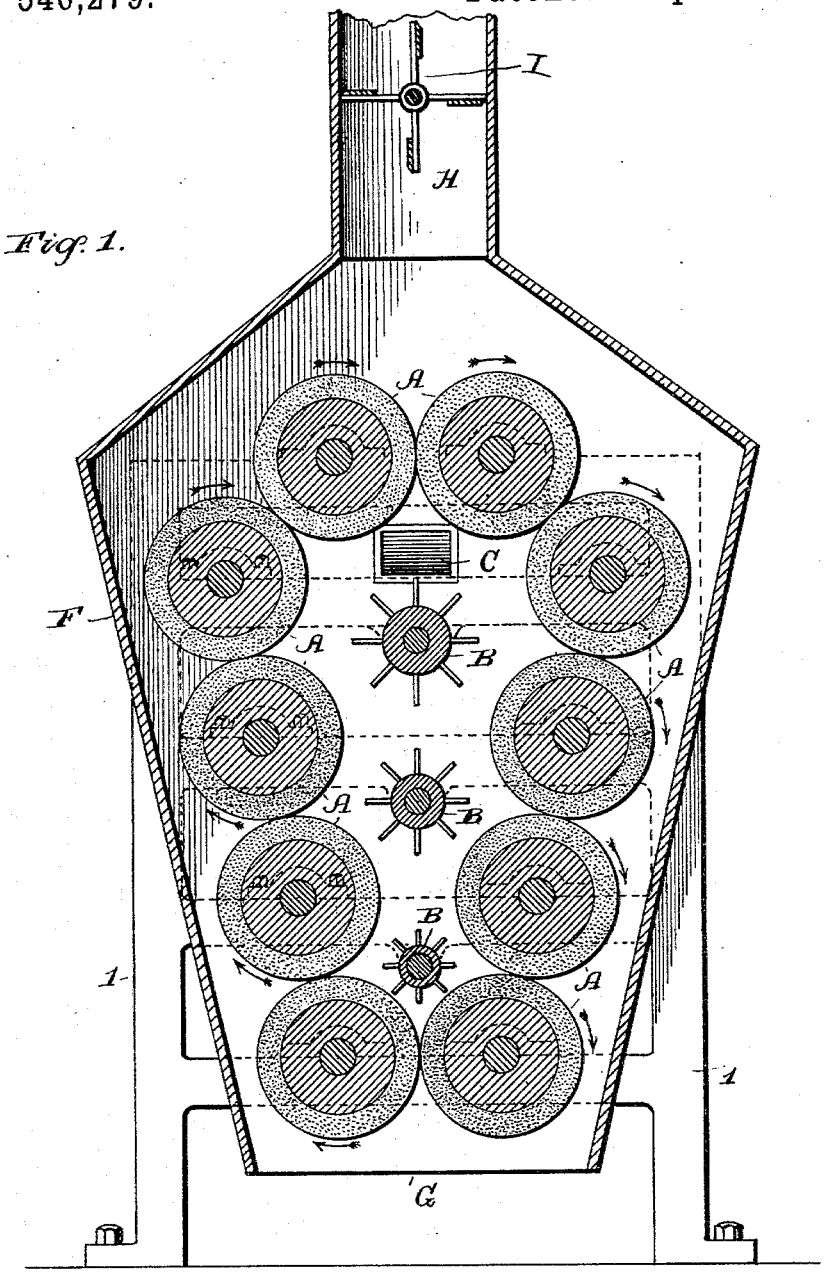

(No Model.) 2 Sheets—Sheet 1.
J. J. FAULKNER.
COTTON SEED DELINTER.

No. 546,279. Patented Sept. 10, 1895.

Witnesses
Victor J. Evans.
Marie Wilson

Inventor
James J. Faulkner.
by E. M. Marble & Sons
Attorneys

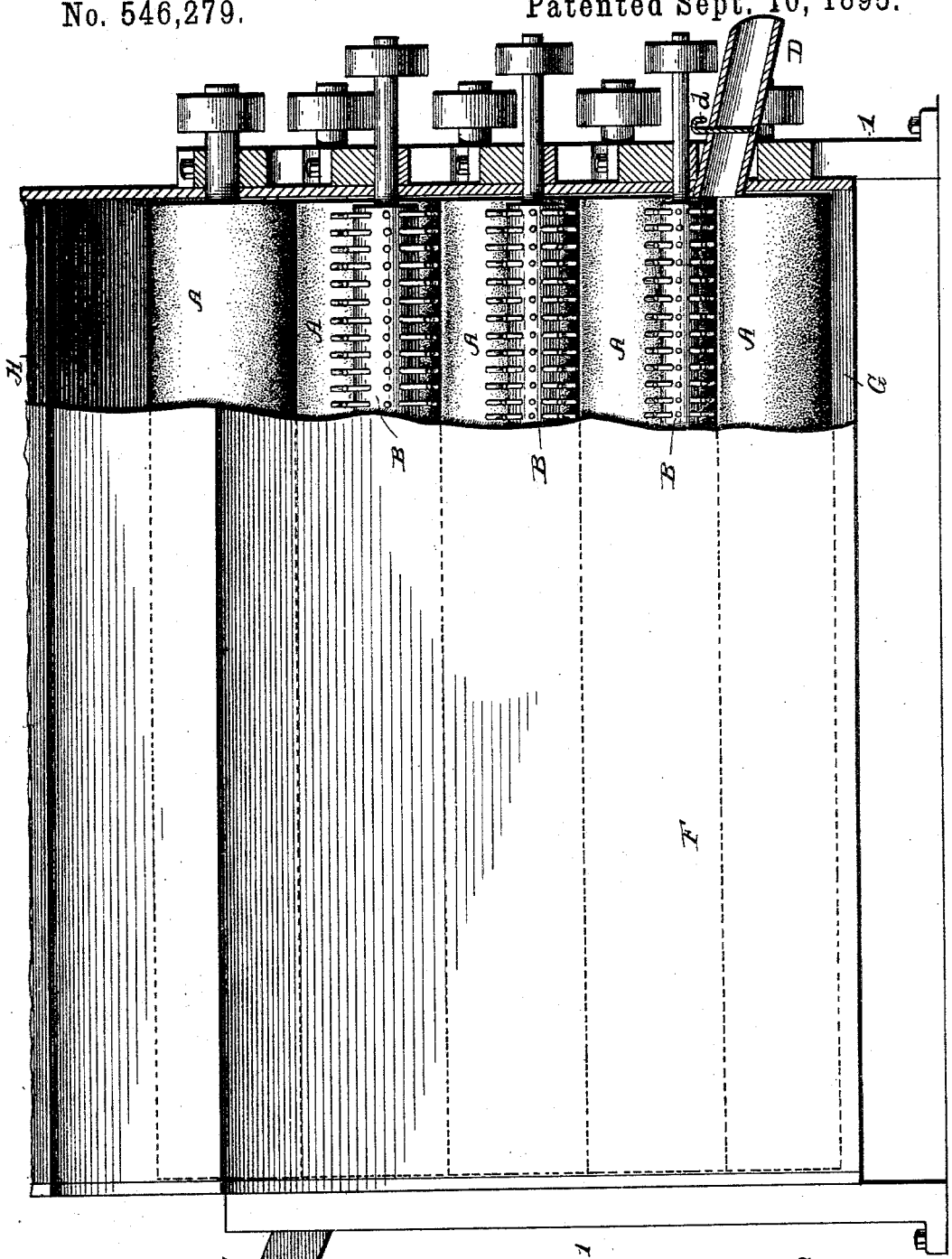

UNITED STATES PATENT OFFICE.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 546,279, dated September 10, 1895.

Application filed July 9, 1895. Serial No. 555,433. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved cotton-seed delinter whose construction and arrangement of parts will be hereinafter fully described, and particularly pointed out in the claims.

In an application for Letters Patent filed by me June 13, 1895, and serially numbered 552,686, I have described a cotton-seed delinter in which the removal of the lint from the seed under treatment is effected by feeding the seed into a pocket formed by a series of positively-actuated abrading-rolls. These rolls are placed, in the construction shown in said application, with their surfaces in such close proximity that seed will not pass between the same and are arranged in the arc of a circle, so that, with the aid of an abrading-cylinder which closes the space between the end rolls, a complete inclosure is thus formed for the reception of the seed. Machines of this type are usually constructed with a number of abrading-pockets stationed around a central abrading-cylinder and possess, therefore, too great a capacity to be economically used in a place where only a small amount of seed is to be delinted.

The object of my present invention is to devise a machine of the "pocket" type which, while possessing the full measure of advantages belonging to the machine described in the application referred to, will be small enough to be suitable for use in connection with small seed-supply stations.

In accomplishing the object of my invention I arrange the abrading-rolls so as to form a complete inclosure, into which the seed to be treated is fed and from which the cleaned seed is discharged. The lint removal takes place, as before, by being drawn out of the seed-pocket by the abrading-rolls as they complete their revolution. In my present machine I also arrange the abrading-rolls horizontally and form, by suitably journaling the rolls, a V-shaped inclosure, into the upper part of which the seed is fed into the machine at one end of the abrading-rolls and from the bottom of which the seed is discharged from the machine at the other end thereof. Agitators operating within the said pocket and graded in size in accordance with the space in which they are operating constantly force the seed under treatment into contact with the abrading-surfaces and compel a complete and thorough scouring of the same. As the seed becomes cleaned and approaches the discharge end of the machine it naturally, by reason of its increasing specific gravity, seeks a position toward the bottom of the seed-pocket, and there, owing to the form of the pocket, is brought into a more intimate relation with the abrading-surfaces, and the lint is thus more perfectly removed from the surface of the same.

To free the outer surfaces of the abrading-rolls from lint, I provide an air-current, which sweeps over the outer surface of the rolls. I effect the separation of dirt and other impurities from the lint by surrounding the rolls with a casing the bottom of which is open and at the top of which an air-flume is stationed. The strength of the air-current, while sufficient to carry away the lint, is not sufficient to carry away the coarse dirt and other impurities discharged from the seed-pocket, so that the desired separation is thereby effected.

My invention is full illustrated in the drawings which accompany and form a part of this application, in which the same reference letters and numerals refer to the same or corresponding parts, and in which—

Figure 1 is a central vertical section of my machine. Fig. 2 is a side elevation of my machine, part of the casing thereof and a portion of the abrading-rolls being broken away, so as to illustrate the arrangement of the agitators within the inclosure formed by the abrading-rolls.

Referring to the drawings, 1 represents the machine-frame, in which is journaled the series of positively-actuated abrading-rolls A, all moving in the same direction, which form the inclosure within which the seed is operated upon. These rolls are arranged to form a V-shaped inclosure, within which operate the agitators B. These agitators are graded in size in accordance with the width of the space in which they operate. Feeding of seed to the machine takes place through the feed-spout C, which opens into one end of the seed-pocket, near the top thereof. The passage of the seed through the machine is effected simply by continually feeding the seed into the machine, the natural gravitation of the seed, when exposed to the action of the revolving surfaces which form the irregularly-shaped aperture in which it is confined, being relied upon to cause a sufficiently rapid passage to the discharge end of the machine. The seed as it is fed into the V-shaped inclosure formed by the abrading-rolls falls into the portion of the inclosure which has the greatest width, and is thus subjected at once to the scouring action of the abrading-surfaces by being thrown thereagainst by the agitator B, which is the largest of the series of agitators used. The scouring action at this point is not very complete. It is sufficient, however, to remove from the surface of the seed the long fibers adhering thereto. The seed as it gradually feeds through the machine by reason of its increasing specific gravity falls to the bottom of the inclosure, where it is subjected to a more intimate treatment by the abrading-surfaces. The treatment to which it is subjected thus grows more and more intimate as the discharge end of the machine is approached. This operation is the one best suited to effect the complete removal of the lint from the seed, as the seed should be subjected to a closer relation with the abrading-surfaces as it becomes cleaned in order that the removal of the short fibers adhering thereto may be effected.

The discharge of the seed from the machine takes place through the outlet-opening D, which is controlled by valve $d$.

The removal of the lint and the impurities, such as leaves and bolls, which are present with the seed as it is fed into the machine is effected by the abrading-rollers A as they complete their revolution. Injury to the seed is, however, impossible in this machine, as the seed cannot pass between the rollers, but, if it attempts to do so, will be thrown back. This action is due to the fact that when the rolls rotate in the same direction contiguous faces thereof move in opposite directions. The discharge of any large body is thus impossible. Particles of lint, however, will adhere to the abrading-surfaces of the rolls, which are preferably formed of emery, and be drawn out of the machine. Surrounding the abrading-rolls is a casing F, which is formed with an open bottom G. At the top of the casing there is formed an air-flume H, in which an exhaust-fan I is journaled, which causes an upward draft of air to sweep over the outer surfaces of the abrading-rolls. The force of the air-current is so regulated, however, as to permit the impurities present with the lint to fall through the open bottom of the machine. The separation of all the products is thus effected.

The operation of my machine is as follows: Seed is fed into the machine through the seed-spout C and is at once subjected to the scouring or abrading action of the rolls A by being thrown thereagainst by the agitators B. The agitators are mounted within the space inclosed by the abrading-rolls. The action of the abrading-surfaces upon the seed grows more intimate as the seed approaches the discharge end of the machine, and, by reason of the fact that its specific gravity increases in proportion to the extent of removal of lint therefrom, falls into the bottom of the pocket formed by the rolls. The seed is finally discharged through the discharge-opening D in quantities regulated by its condition. The valve $d$ is used to restrict the discharge-opening, so that only a satisfactory product can pass through the same.

Lint removal is effected by the abrading-rolls A as they complete their revolution. The lint-removing surface is thus as great as the abrading-surface itself, so that a very complete lint removal is effected. An upward air-current sweeping over the outer faces of the abrading-rolls draws upward into the air-flume H the lint which is scoured off the surface of the seed. Dirt and other impurities fall, however, through the open bottom of the casing F on account of the regulation of the strength of the air-current.

The operation of my machine is very complete and satisfactory. A separation and gradation of all the products are obtained. The capacity of the machine is found to be greater than that of the machines now in general use, in which a delinting-cylinder and a casing therefor are used.

Having thus fully described my invention, what I claim as new, and desire to secure by Letters Patent, is—

1. In a cotton seed delinter, the combination with a series of positively actuated abrading rolls, arranged so that they form a V-shaped inclosure, and placed with their surfaces in such close proximity that seed will not pass between the same, and means for causing said rolls to rotate in the same direction, of seed inlet and discharge openings, and means for removing the lint separated by the action of the machine, substantially as described.

2. In a cotton seed delinter, the combination with a series of positively actuated abrading rolls, arranged so that they form a V-shaped inclosure, and placed with their meeting surfaces in such close proximity that seed will not pass between the same, and means for causing said rolls to rotate in the same direction, of seed inlet and discharge openings, and means for causing an air current to sweep over the outer surface of said rolls, substantially as described.

3. In a cotton seed delinter, the combination with a series of positively-actuated abrading rolls, arranged so that they form a V-shaped inclosure, and placed with their meeting surfaces in such close proximity that seed will not pass between the same, and means for causing said rolls to rotate in the same direction, of seed inlet and discharge openings, means for causing an air current to sweep over the outer surface of said rolls, and agitators stationed within the inclosure formed, substantially as described.

4. In a cotton seed delinter, the combination with a series of horizontally-arranged, positively-actuated abrading rolls, arranged to form a V-shaped inclosure, and placed with their meeting surfaces in such close proximity that seed will not pass between the same, and means for causing said rolls to rotate in the same direction, of seed inlet and discharge openings, agitators, graded in size according to the size of the space in which they operate, stationed within said inclosure, and means for causing an air current to sweep over the outer surface of said rolls, substantially as described.

5. In a cotton seed delinter, the combination with a series of horizontally-arranged positively-actuated abrading rolls, arranged to form a V-shaped inclosure, and placed with their meeting surfaces in such close proximity that seed will not pass between the same, and means for causing said rolls to rotate in the same direction, of a seed inlet opening at one end of the inclosure at the top thereof, a seed discharge opening at the opposite end of the inclosure near the bottom thereof, agitators, graded in size according to the size of the space in which they operate, stationed within said inclosure, and means for causing an air current to sweep over the outer surface of said rolls, substantially as described.

In testimony whereof I affix my signature in presence of two witnesses.

JAMES J. FAULKNER.

Witnesses:
C. L. BERLIN,
JOHN HALLUM.